United States Patent [19]
Wakabayashi et al.

[11] Patent Number: 5,645,502
[45] Date of Patent: Jul. 8, 1997

[54] PHASED CONTINUOUSLY VARIABLE TRANSMISSION CHAIN

[75] Inventors: Shozo Wakabayashi, Hirakata; Yukio Tomimura; Koji Morishige, both of Nabari; Hiroshi Umeda, Mie; Park Woo Serk, Nabari, all of Japan; Mark Alan Boshart, Cortland, N.Y.

[73] Assignee: Borg-Warner Automotive, K.K., Nabari, Japan

[21] Appl. No.: 543,441

[22] Filed: Oct. 16, 1995

[30] Foreign Application Priority Data

Oct. 17, 1994 [JP] Japan .................... 6-277126

[51] Int. Cl.⁶ .................................................. F16H 7/00
[52] U.S. Cl. .................................................. 474/85; 474/245
[58] Field of Search ........................... 474/84, 85, 242, 474/244, 245

[56] References Cited

U.S. PATENT DOCUMENTS

| | | | |
|---|---|---|---|
| 4,938,737 | 7/1990 | Yamamuro | 474/242 |
| 4,993,999 | 2/1991 | Mott | 474/242 X |
| 5,026,332 | 6/1991 | Mott et al. | 474/242 |
| 5,061,226 | 10/1991 | Mott | 474/244 |
| 5,090,948 | 2/1992 | Orth | 474/245 |
| 5,131,892 | 7/1992 | Mott | 474/242 X |
| 5,318,485 | 6/1994 | Bateman | 474/245 |
| 5,393,272 | 2/1995 | Okuwaki et al. | 474/213 |
| 5,409,424 | 4/1995 | Okuwaki et al. | 474/212 |
| 5,439,423 | 8/1995 | Okuwaki et al. | 474/245 |

FOREIGN PATENT DOCUMENTS 6-94084   4/1994   Japan .

*Primary Examiner*—Roger J. Schoeppel
*Attorney, Agent, or Firm*—Hugh A. Abrams, Esq.; Greg Dziegielewski, Esq.

[57] ABSTRACT

The power transmission chain of the present invention is formed of two parallel chains that are phased or offset by approximately one-half pitch. The chains are connected by struts that extend across the entire width of both chains. The power transmission chain belt of this invention provides for a restricting device in the interchain gap of the load block. Offset occurring during the speed change of a continuously variable transmission can be absorbed by the above mentioned gap. In one embodiment, the restricting device is in the form of a stop ring provided near the middle of the gap between the two side-by-side chains.

9 Claims, 5 Drawing Sheets

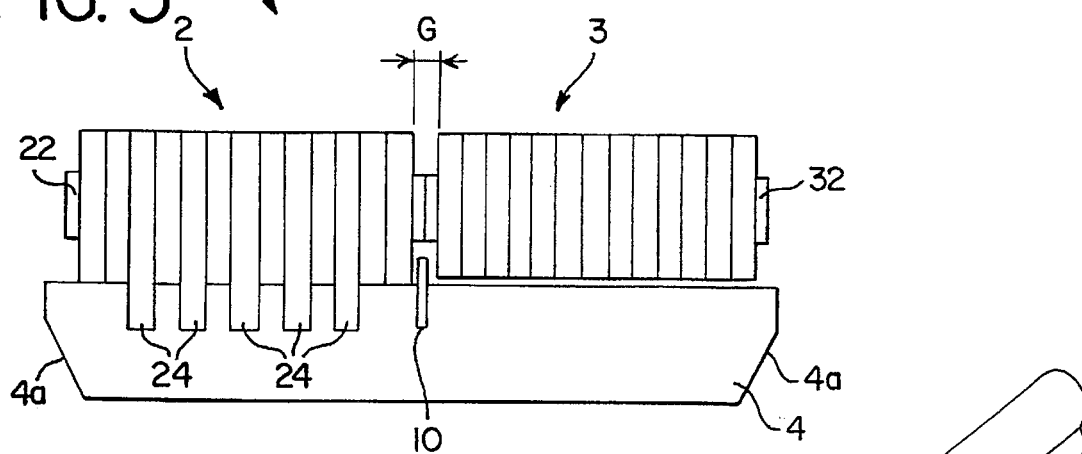
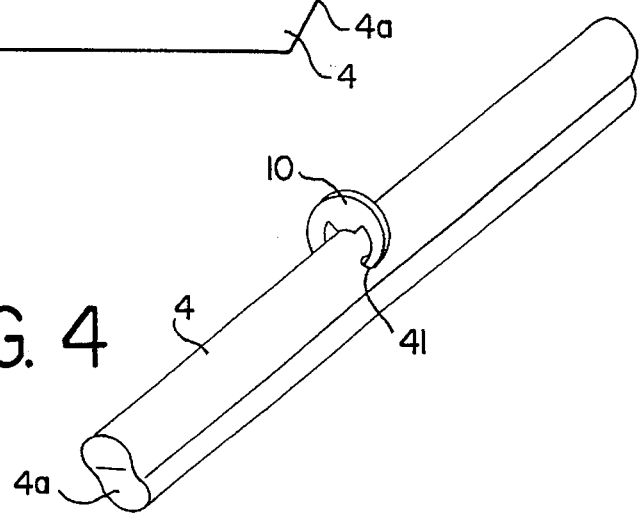
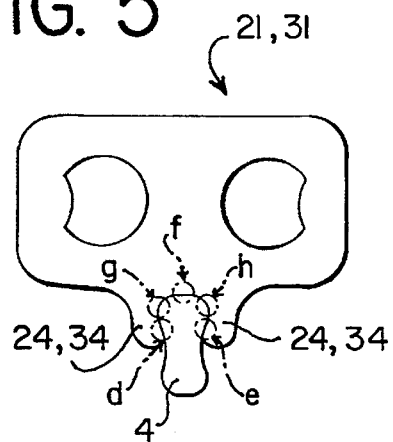
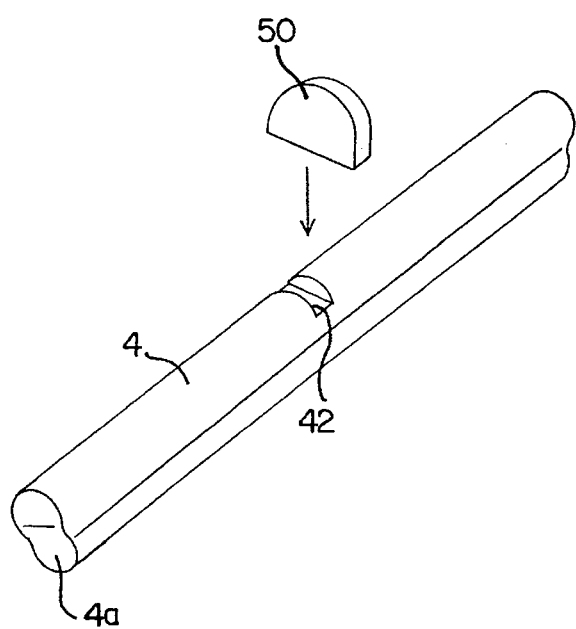

PHASED CONTINUOUSLY VARIABLE TRANSMISSION CHAIN

BACKGROUND OF THE INVENTION

This invention relates to a power transmission chain belt and, in particular, to a power transmission chain belt for use with a continuously variable transmission (CVT). The belt is comprised of a large number of interleaved link plates which are placed parallel to the chain width direction and carry a number of load blocks or struts for transmission of power to the variable width pulleys of the CVT. The belt is formed of two adjacent chains or chain portions that are offset or phased by one half pitch.

An example of a power transmission chain belt for a CVT is shown in FIG. 12 of the drawings. As shown in FIG. 12, the CVT includes input shaft 101 and output shaft 102, which carry primary (drive) and secondary (driven) pulleys 103, 104, respectively. The chain belt 105 interconnects the primary and secondary pulleys of the CVT.

Primary pulley 103 includes fixed pulley portion 103a, which is fixed to input shaft 101, and moveable pulley 103b, which is moveable along input shaft 101, but does not rotate relative to the shaft. Similarly, secondary pulley 104 includes fixed pulley 104a, which is fixed to output shaft 102, and moveable pulley 104b, which is moveable along output shaft 102, but does not rotate relative to the shaft. The effective diameters of pulleys 103 and 104 are changed by movement of the moveable pulley portions 103b, 104b, which is caused by operation of hydraulic actuators, as is known in the art. In this manner, the speed change ratio between the input and output shafts can be varied continuously.

The chain belt is shown in FIG. 13 and includes two chains or chain portions 110, 111. The chain also includes load blocks or struts 112, which are arranged in the direction of the length of the chain and extend across the width of the chain. The chains 110, 111 are connected alternately by the struts passing between both chain widths. The pulleys contact the outside edges of the struts to pass power between the chain and the pulleys.

The chains are each comprised of link plates that are connected by connecting pins 106, 107. Protrusion 118 is formed at the connection of the chain to each strut to prevent displacement of the strut in the chain width direction (the left to right direction in FIG. 13). Protrusion 118 is formed by a punching tool that is applied to the side of strut 112. Also, the protrusion 118 is formed, as shown in FIG. 14, so that to engage part d or part e of the link at the tips of V-shaped leg parts 121 and 122 or link plate 120. Thus protrusion 118 engages with parts d and e and prevents the release of strut 112 from the chain link plate.

The speed ratio between the input and output shafts is changed by moving the moving pulleys 103b, 104b on the primary and secondary shafts during the operation of the CVT. An offset occurs between pulleys 103 and 104, as shown in FIG. 12, when the speed ratio between the primary and secondary shafts is not one to one. Accordingly, in such a condition, a force acts on the chain belt 105 in the chain width direction, and each strut 112 tends to move in that direction, i.e., the length direction of the strut.

Although release of the strut from the link plate is prevented by protrusion 118 at strut 112, the protrusion is not very large in length. Therefore, the protrusion wears gradually under repeated action of the force in the chain width direction and the release of the strut 112 from link plate 120 may eventually occur.

As shown in FIG. 14, protrusions 118 are placed against part d and part e of the tips of the link plate leg parts 121, 122. The rigidity of the link plate leg parts is not exceptionally high. Therefore, under repeated action of force in the chain width direction, leg parts 121, 122 twist in their thickness direction and, as a result, displacement of the strut 112 gradually increases. Eventually, the protrusion may slide over leg parts 121, 122 so that the strut is no longer held to the link plate.

The present invention is directed to such a situation and offers a chain belt in which the strut is held to the link plate with greater assurance.

SUMMARY OF THE INVENTION

In one embodiment, the present invention comprises a power transmission chain in which two or more chains are provided in parallel in the chain width direction. Each chain includes a number of interleaved link plates and struts positioned below the link plates for transfer of power from the pulleys to the chain belt. The struts, or load blocks, also connect each of the side-by-side portions of the chain together. The two or more chains or chain portions are offset, or phased, in their longitudinal directions. The offset, in one embodiment, is approximately one-half chain pitch length.

As noted above, the chain belt interconnects the input and output shafts of a continuously variable transmission (CVT). The input and output shafts include primary (drive) and secondary (driven) pulleys which have variable effective diameters and are attached to the input and output shafts, respectively. The chain belt permits the transfer of power from the input shaft to the output shaft through the variable pulleys and belt.

The load blocks or struts of the chain belt are held by the link plates in a passageway between link leg parts. A stopper means or stopper member is provided in an intermediate portion of the struts for inhibiting sideways movement of the struts. A clearance is provided between the two chains for the area of location of the stopper member. In one embodiment of the present invention, the clearance between each chain is larger than the maximum offset length between the primary and secondary pulleys while changing speed ratios.

The stopper member is shown in several different embodiments in the present invention. In one embodiment, the stopper member has protrusions to prohibit sideways movement of the struts. In another embodiment, the stopper member comprises a concave portion located on the strut for engaging the link plates. In another embodiment, convex curves are formed on the portions of the link plates that engage with concave portions or grooves on the struts. In yet another embodiment, elastic bent toes engage concave portions of the struts.

The stopper member that prevents movement of the load blocks or struts in the chain-width direction are provided near the center of the part of the strut that is located in the gap or clearance between the two chain portions. Therefore, the load block may move about one-half of the total distance of the interchain gap in both directions of the chain width. As noted above, such movement of the strut occurs when a shear force acts in the chain-width direction during operation of the chain belt. Accordingly, the offset that occurs during the change of the ratio between the primary and secondary shafts can be absorbed by the interchain gap.

By setting the interchain gap to a distance larger than the maximum offset that occurs across the drive and driven pulleys, all of the offset that occurs during the speed change can be compensated by the interchain gap and the chain shear force is kept from acting on the restricting device. In this manner, the effect of the stopper member or strut restricting member can be maintained longer and release of the strut from the chain link is prevented.

In one embodiment, the stopper member or restricting member has a protrusion toward the base of the link leg part. Therefore, the protrusion of the stopper mechanism engages the base of the link leg part during exertion of the chain shear force. Since the rigidity of the base of the link leg part is relatively higher at its tip, the leg part is less likely to fail even when the contacting the stopper member and expansion of the leg part is more likely to be prevented and the strut more likely to be maintained within the link member.

In another embodiment, the grooves in the load block engage a part of the link plates. Therefore, movement of the load block is blocked by the link plates during engagement of the shear force. Again, release of the strut from the link parts is prevented in this manner. Similarly, in another embodiment, a convex surface of the link plate engages a groove in the load block. Therefore, release of the load block from the link is prevented and the convex surface on the link plate also permits easier movement of the link plate relative to the load block during bending of the chain.

In yet another embodiment, multiple leg parts are bent in the chain width direction and inserted into grooves in the load block so that the leg parts elastically engage the grooves in the strut.

BRIEF DESCRIPTION OF THE DRAWINGS

The above and other objects, features and advantages of the present invention will be better understood by reading the following detailed description of the presently preferred embodiments of the invention, when considered in connection with the accompanying drawings, in which:

FIG. 3 is a side view of a portion of the chain belt shown in FIG. 1;

FIG. 4 is a perspective view of a stop-ring restricting device installed on a strut;

FIG. 5 is a side elevation view illustrating the positional relationship between the restricting device and the link plate;

FIG. 6 is a perspective view of a semicircular shape plate restricting member installed on a strut;

DETAILED DESCRIPTION OF THE PREFERRED EMBODIMENTS

Several embodiments of this invention will be explained below in detail, by reference to the accompanying drawings.

Figure 1:
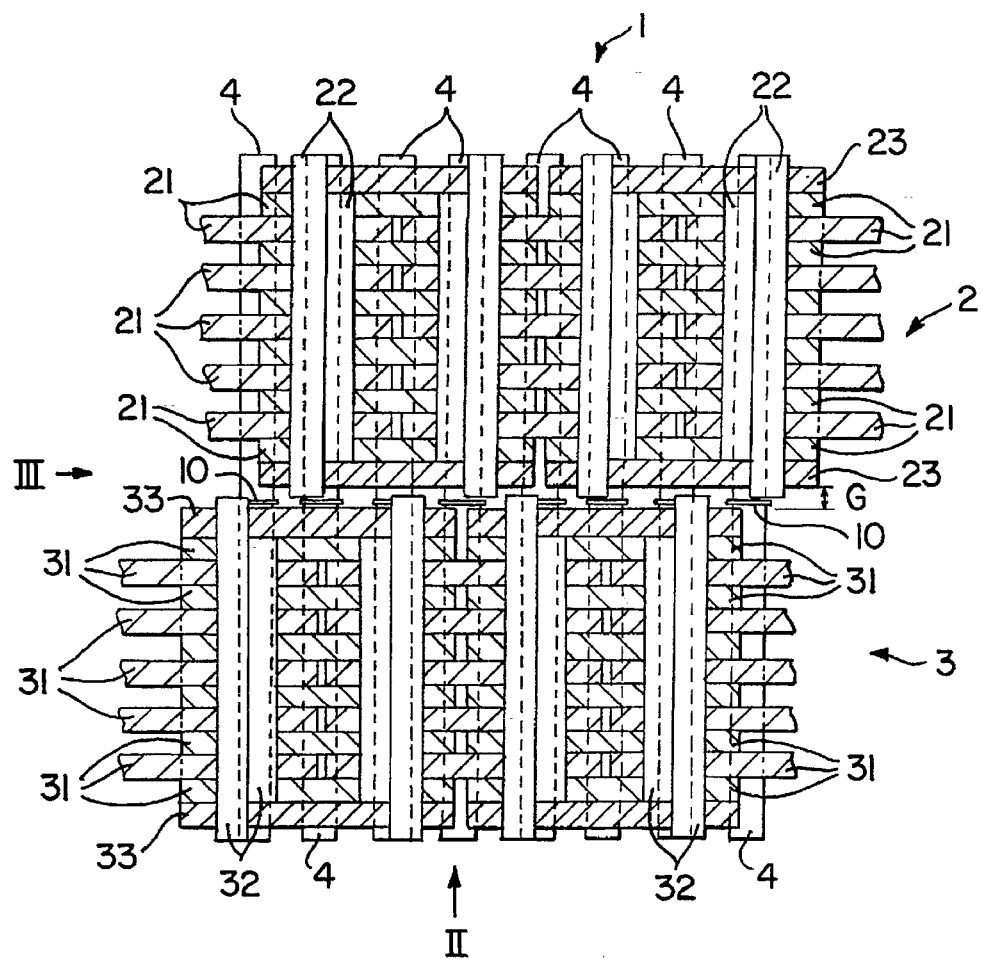
FIG. 1 is a sectional plan view of the CVT power transmission chain belt illustrating the links along a portion of first and second chains.

In the drawings, FIG. 1 is a plan view of a continuously variable transmission (CVT) power transmission chain belt which embodies the present invention. In FIG. 1, the CVT chain consists of two chains or chain portions, 2 and 3, which include interleaved links that are connected in a continuous manner. The two chains are placed side-by-side in the transverse direction. Chain 2 has a large number of link plates 21, and rocker joints. Each rocker joint has a pair of long and short rocker pins, which are inserted in the apertures or pinholes of the link plates 21 for pivotal connection of the link plates 21. In addition, guide link plates 23 are located on the outermost sides of the link plates 21.

Similarly, chain 3 has a large number of interleaved link plates 31 and rocker joints. The rocker joints each have a pair of long and short rocker pins, which are inserted in the apertures or pinholes of the link plates for pivotal connection of the link plates 31. In addition, guide link plates 33 are located on the outermost sides of the link plates 31.

Chains 2 and 3 are arranged parallel to the chain width direction (up/down direction in FIG. 1) with a certain gap G between them. At the same time they are offset by approximately one half pitch. Beneath chains 2 and 3 (below the plane of FIG. 1) multiple struts 4, or load blocks, are arranged in the chain length direction. Chains 2 and 3 are connected alternately to the struts 4.

Figure 2:
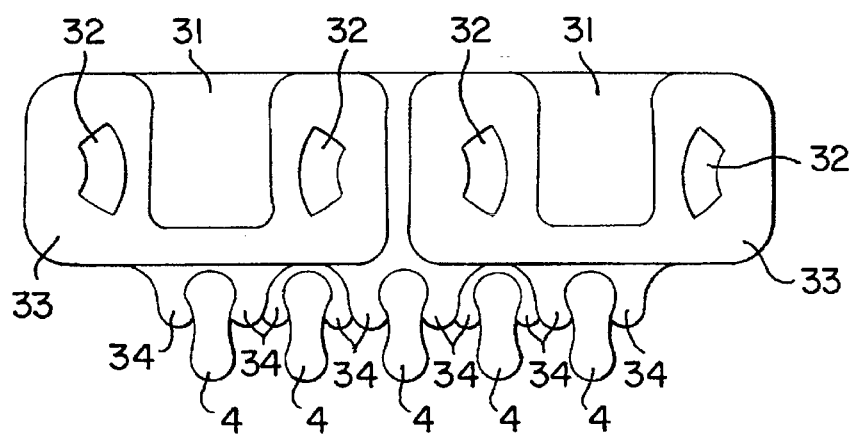
FIG. 2 is a front view of a portion of the chain belt shown in FIG. 1.
Figure 12:
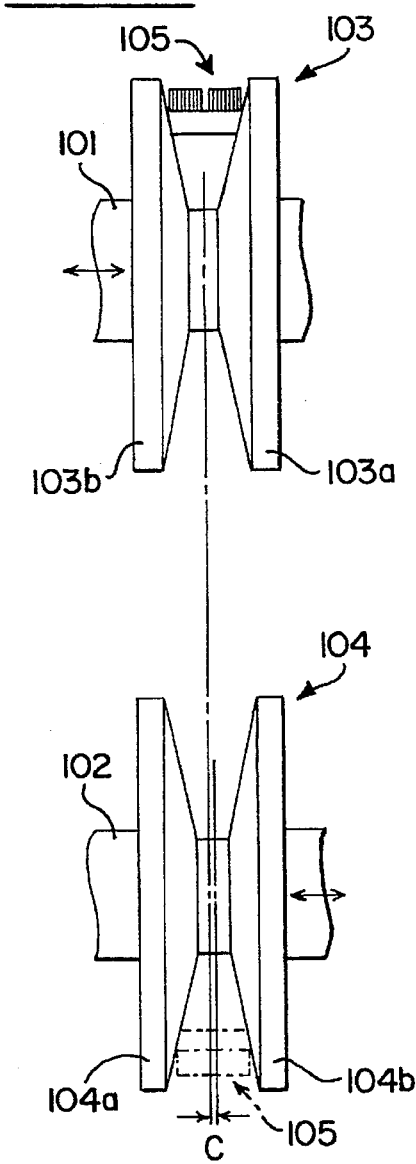
FIG. 12 is a schematic illustration of pair of variable pulleys of a CVT together with a conventional CVT chain belt of the prior art.
Figure 14:
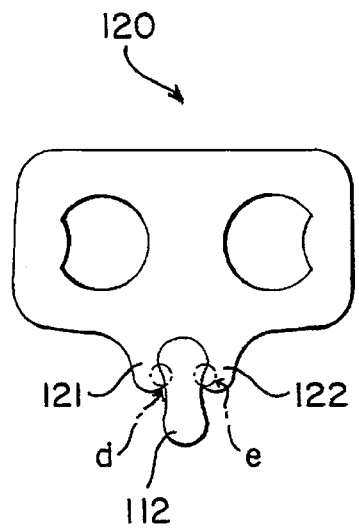
FIG. 14 is a front view of a link plate of the prior art illustrating the positional relationship of a protrusion used as a restricting device.

The struts 4 have a transverse cross-section with a narrow part in the middle as shown in FIG. 2. As shown in FIG. 3, the struts have inclined surfaces 4a at their lengthwise ends. The inclined surfaces 4a contact the V-shape pulley surface, which are shown in FIG. 12.

As shown in FIG. 2, a pair of leg parts 34, which engage the top of the struts 4, is formed at the bottom of the link plate 31. Similarly, as shown in FIG. 2 and FIG. 5, the leg parts 24 are formed on the link plates 21. Additionally, as shown in FIG. 4, two holes 41 are formed in the strut 4, at gap G between chains 2 and 3, for the installation of stop rings. The stop ring (restricting device) 10 is installed in the holes to prevent the release of the strut 4 from the chain links. The stop-ring 10 is located near the center of gap G.

The stop-ring 10 is positioned on the strut 4 so as to engage with base parts f, g, and h of leg parts 24 and 34 of link plates 21 and 31, respectively. FIG. 5 provides an illustration of the contact points of the stop-ring 10.

During operation of the CVT chain, a force acts on the chain 1 in the chain width direction. Accordingly, strut 4 tends to move in the chain width direction, i.e., strut length direction. However, stop-ring 10 engages with link plate 21 or 31, which is fixed to the strut 4 at, the center of gap G between the chains, which restricts movement of the strut 4.

Therefore, the displacement of the strut 4, from the position shown in FIG. 3, in each direction, is $$S=((G-t)/2)$$

where s is the displacement, t is the thickness of the stop-ring 10, and G is the gap between the two chains. Gap G is adjustable by changing the protrusion, beyond the guide link plates 23 and 33, of the rocker pins 22 and 32, to allow greater distance between the two chains.

Here, if s is set larger than the maximum offset that occurs between the drive and driven pulleys during speed change, then all offset during speed change can be compensated by gap G. Alternately, s can be set slightly smaller than the maximum offset, in which case a part of the maximum offset (corresponding to s) is compensated by gap G, and the chain shear force that corresponds to the remainder (the amount exceeding s) is borne by the stop-ring 10.

In this manner, direct action of the chain shear force on the stop-ring 10 can be prevented. Thus, the restricting effect of the stop-ring 10 can be maintained for a long time and the release of the strut 4 from the chain links can more assuredly be prevented.

The stop-ring 10 interferes with the link plates 21 and 31 at the base portion parts f, g and h, as illustrated in FIG. 5. These parts are not the tip parts of the link plate leg parts 24 and 34 and, therefore, have a higher rigidity than the tip parts. Therefore, even when the chain shear force acts on the stop-ring 10 and the stop-ring 10 interferes repeatedly with the link plate leg parts 24 and 34, the leg parts do not buckle easily. Thus, they tend not to be twisted in the direction of their thickness. Accordingly, expansion of the gap between the link plate leg parts 24 and 34 and the strut 4 is prevented and the result is the more assured prevention of the release of the strut from the link plates. Moreover, attachment of the stop-ring 10 can be made after the assembly of the chains 2 and 3 and the struts 4, which eases the entire assembly process.

Figure 7:
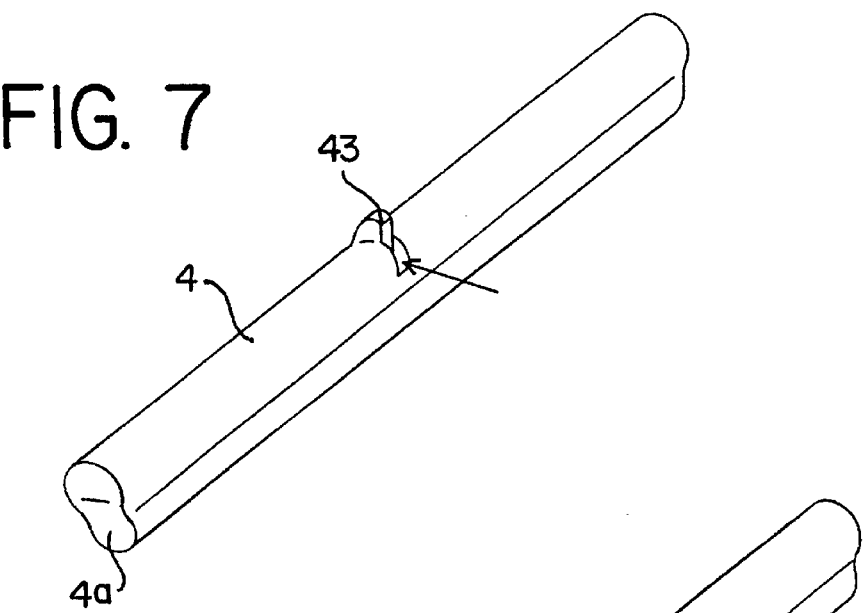
FIG. 7 is a perspective view of a upward protrusion formed for use as a restricting member on a strut.

The above embodiment provides an example of the use of the stop-ring 10 as a restricting device. However, the restricting device is not limited to this specific application of this invention. FIGS. 6-8 illustrate modified examples of the restricting device, or stopper mechanism.

In the embodiment shown in FIG. 6, plate 50, which is of nearly semicircular shape, is provided as the restricting device. The bottom part of plate 50 is inserted into groove 42 formed on the top of strut 4. The location of the interference of plate 50 with the link plates 21 and 31 are at the position of parts f, g and h, which are the base parts of the link plate leg parts 24 and 34. This is similar to the case of the stop-ring 10 illustrated in FIG. 5. Therefore, the link plate leg parts, 24 and 34, are less likely to deform even when the shear force in chain width direction acts upon them.

In the embodiment shown in FIG. 7, protrusion 43 is formed as a restricting device. The protrusion 43 is formed as part of the pin by the application of the force of a press machine, in the direction of the arrow shown in FIG. 7, near the middle part of the strut 4. The protrusion then protrudes in the upward direction.

Figure 8A:
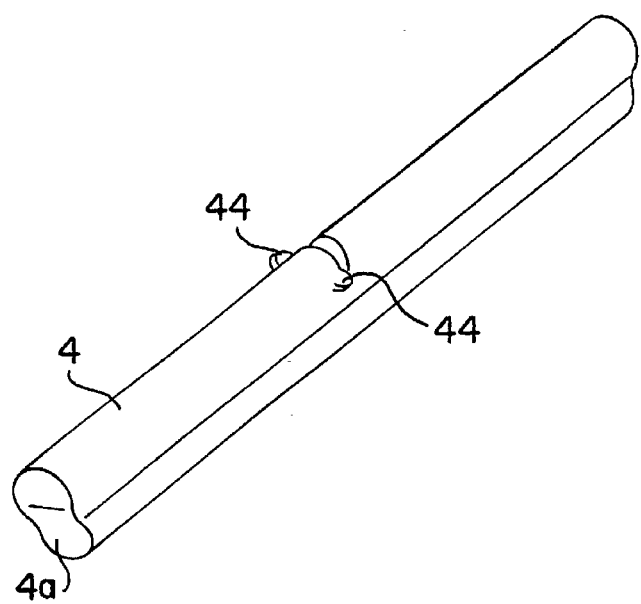
FIG. 8(a) and 8(b) are perspective views of modified protrusions formed as restricting members on a strut.
Figure 8B:
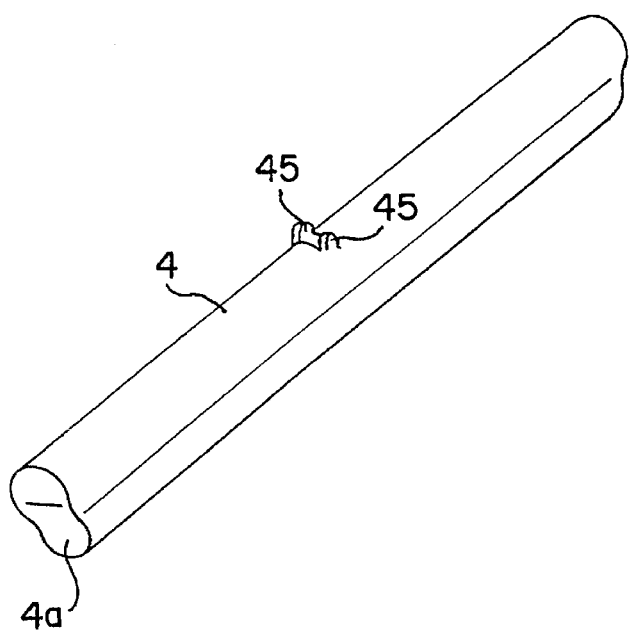

In the embodiment of FIG. 8(a), protrusion 44 is formed by application of a compressive force of a press machine in a lateral direction and downward on the strut 4. Alternately, the embodiment of FIG. 8(b) illustrates a protrusion 45 formed similarly by the compressive force of the press machine, but protruding upward by reason of the force applied to the strut 4.

The locations of the engagement of protrusions 43, 44 and 45 in FIG. 7 and FIG. 8 is at the point of parts f, g and h in FIG. 5, which are the base portions of the link plate leg parts 24 and 34. Therefore, the link plate leg parts 24 and 34, are less likely to deform, even under the chain shear force.

The above embodiment and modified examples have the restricting devices, such as the stop-ring 10, plate 50, and the like, located at the middle part of the strut. The middle part of the strut is located in gap G between chains 2 and 3. However, the present invention is not limited to these types of arrangements.

Figure 13:
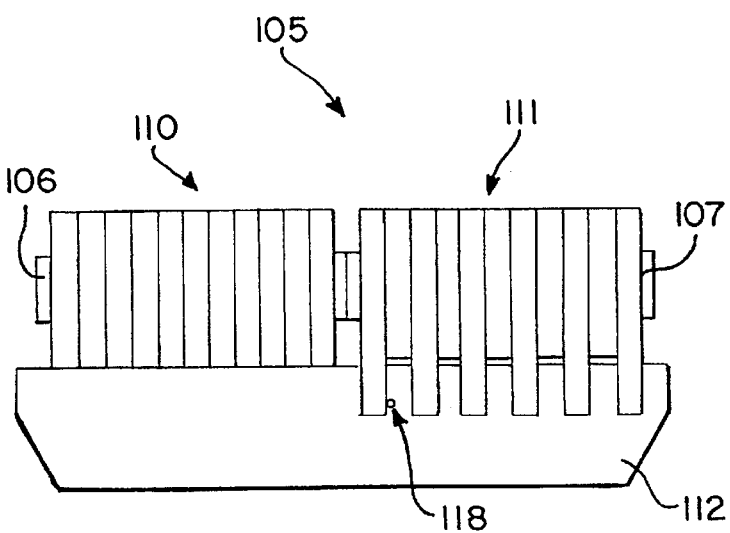
FIG. 13 is a side view of a conventional CVT chain belt of the prior art with a protrusion member.

That is, the above restricting device can be located near the connection part of the strut 4 to chains 2 and 3. For example, FIG. 13 illustrates the location of the formation of the protrusion at 118. In such a case, the thickness of the restricting device needs to be less than the link plate thickness.

Also, in the above embodiment and modified examples, the restricting device is provided separately from the link plate. However, this invention is not limited to such an arrangement. FIG. 9 and FIG. 10 illustrate that the link plate itself can be made to function as the restricting device.

Figure 9A:
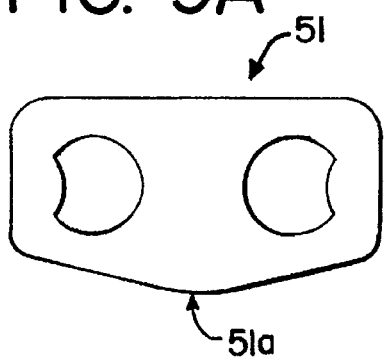
FIG. 9(a) is a side view of a link plate made to function as a restricting device and FIG. 9(b) is a front view of a strut with the link plate of FIG. 9(a)
Figure 9B:
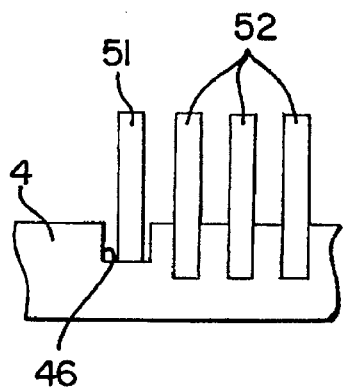

In FIG. 9(b), groove 46 is formed on the top of strut 4 and the bottom of link plate 51 is inserted into groove 46. Link plate 51 differs from the other link plate 52. Link plate 51 has a convex surface formed at its bottom 51a, which is illustrated in FIG. 9(a). Thereby, link plate 51 can act as a restricting device. When the chain shear force acts, link plate 51 engages with groove 46, blocking the movement of strut 4 and preventing strut 4 from release from the link plates. In addition, formation of the convex arc-like surface 51a at the bottom of the link plate 51 provides for easier rolling of the link plate 51 relative to the strut 4 during bending of the chain.

Figure 10A:
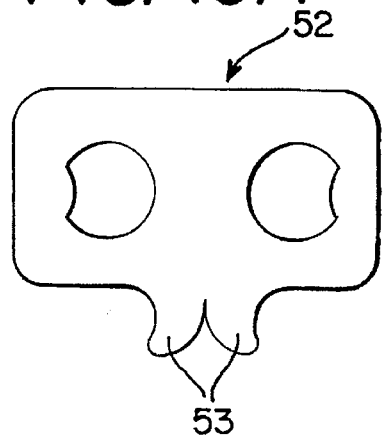
FIG. 10 is a side view of a modified link plate made to function as a restricting device and FIG. 10(b) is a front view of a strut with the link plate of FIG. 10(a)
Figure 10B:
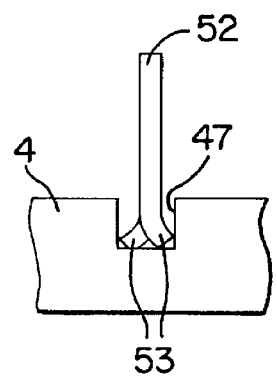

In FIG. 10(b), groove 47 is formed on the top of strut 4 and the bottom of link plate 52 is inserted into groove 47. In contrast to other link plates, link plate 52 has a V-shaped leg part 52 formed at its bottom, as shown in FIG. 10(a). Leg part 53 can be created in a three-legged form in addition to the two-legged form. FIG. 10(b) illustrates that the leg parts 53 are bent alternatingly in the thickness direction of the link plate 52, and engage groove 47 elastically.

Therefore, when the chain shear force acts, the movement of the strut 4 is blocked by link plate 52 acting as a means of restriction. Restriction occurs through the engagement of the link plate 52 with groove 47, similar to FIG. 9, and prevention of strut 4 being released from the link plates is assured. In addition, the offset which occurs during the speed change can be compensated by the elastic deformation of the link plate leg parts 53. This occurs by elastic contact between the link plate leg parts 53 and strut groove 47. Thereby, the restrictive effect of the link plate leg parts 53 can be maintained for a long time, even under the repeated action of the chain shear force, and, as a result, strut 4 is maintained within the link plates.

The above embodiments and modified examples illustrate the application of this invention to the CVT chain composed of two chains. However, this invention can also be applied similarly to chains with three or more chains or chain portions.

Figure 11:
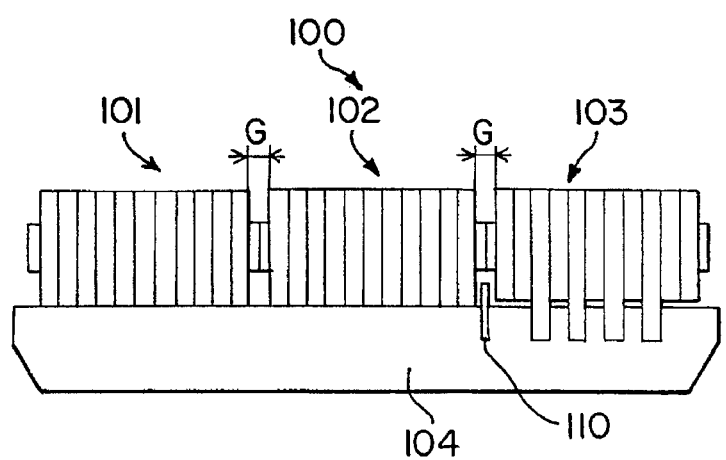
FIG. 11 is a side view of an embodiment of this invention in a CVT chain composed of three laminated chains.

FIG. 11 illustrates a CVT chain 100 that is formed of three chains, 101, 102 and 103. Each chain is connected to another, and gap G is formed between the chains. Also, one stop-ring 110 is provided to each strut 104 to prevent release of the strut from the link plates. That is, a stop-ring 110 need not be provided for each gap G of all the struts 104. Its provision to any one gap G of each strut 104 will suffice. In this embodiment, the stop-ring is cited as an example of the restricting device. However, the other restricting devices shown in the above modified examples can be used in the CVT chain of FIG. 11.

It is to be understood that various other modifications or changes can be made in this invention, without departing the spirit and scope of the invention defined in the following claims.

What is claimed is:

1. A power transmission chain-belt engageable with pulleys each having a V-shaped groove, comprising:

at least two chains arranged in side-by-side parallel relationship with each other, each of said two chains including a plurality of sets of parallel links and pivot members, said sets of parallel links being connected to each other by said pivot members, said two chains being offset from each other in a longitudinal direction thereof by a distance equal to approximately one-half pitch of said sets of parallel links;

a plurality of load block members arranged in spaced-apart parallel relationship with each other and alternately engaging an inner side of each of said two chains, each of said load blocks being oriented transversely to said two chains and having a length which substantially covers a total width of said two chains, each of said load block members having opposite end faces which define said length thereof;

each of said plurality of sets of parallel links including a plurality of links plates, each of said link plates having an inner-side end face facing said load block members and a pair of legs extending from the inner-side for engaging said load block members;

a stopper member located at an intermediate portion of said load block member, said stopper member being spaced apart from said chains to permit limited movement of said load block member in a direction transverse to said chains.

2. The power transmission chain-belt of claim 1 wherein said stopper member has a rounded top portion with a pair of extending legs that engage a pair of apertures formed in said load block member.

3. The power transmission chain-belt of claim 1 wherein said stopper member is substantially semi-circular in shape and is held in a groove formed in said load block member.

4. The power transmission chain-belt of claim 1 wherein said stopper member is an upwardly-extending protrusion formed in said load block member.

5. The power transmission chain-belt of claim 1 wherein said stopper member is a pair of horizontally-extending protrusions formed in said load block member.

6. The power transmission chain-belt of claim 1 wherein said stopper member is a pair of upwardly-extending protrusions formed in said load block member.

7. The power transmission chain-belt of claim 1 wherein said plurality of sets of parallel links include link plates having a convex portion at the inner-side end facing said load block members, said load block member having a groove portion for receiving said convex portion of said link plates.

8. The power transmission chain-belt of claim 1 wherein said plurality of sets of parallel links include link plates having a v-shaped leg part at the inner-side end facing said load block members, said load block member having a groove portion for receiving said v-shaped leg part of said link plates.

9. The power transmission chain belt of claim 1 wherein said chain-belt includes a third chain arranged in side-by-side parallel relationship with said two chains, said load block members having a length which substantially covers a total width of said three chains.

* * * * *